United States Patent
Lent-Phillips et al.

(10) Patent No.: US 6,672,916 B1
(45) Date of Patent: Jan. 6, 2004

(54) AMPHIBIOUS VEHICLE

(75) Inventors: Hans-Martin Lent-Phillips, Gifhorn (DE); Ulrich Hackenberg, Wettstetten (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/009,546

(22) PCT Filed: May 31, 2000

(86) PCT No.: PCT/EP00/04980
§ 371 (c)(1),
(2), (4) Date: Apr. 22, 2002

(87) PCT Pub. No.: WO00/76794
PCT Pub. Date: Dec. 21, 2000

(30) Foreign Application Priority Data

Jun. 9, 1999 (DE) ......................................... 199 26 145

(51) Int. Cl.$^7$ ............................................... B63H 19/08
(52) U.S. Cl. ..................................... 440/12.5; 440/12.51
(58) Field of Search ................... 440/12.5, 12.51–12.59, 440/12.63, 12.64, 12.65; 180/7.3, 7.4, 233, 234, 247, 251

(56) References Cited

U.S. PATENT DOCUMENTS

| | | | | |
|---|---|---|---|---|
| 1,641,574 A | * | 9/1927 | Chavez | 440/12.52 |
| 2,341,165 A | * | 2/1944 | Todd | 440/88 R |
| 2,397,791 A | * | 4/1946 | Kramer et al. | 440/12.57 |
| 2,400,132 A | * | 5/1946 | Porter | 440/12.59 |
| 2,406,290 A | * | 8/1946 | Hait | 440/12.56 |
| 3,176,585 A | * | 4/1965 | Ruf | 89/36.08 |
| 3,395,672 A | * | 8/1968 | Ruf | 440/12.6 |
| 3,420,204 A | * | 1/1969 | Samuel | 440/12.56 |
| 3,426,720 A | * | 2/1969 | Enos | 440/12.66 |
| 3,428,016 A | * | 2/1969 | Holm | 440/12.54 |
| 3,444,837 A | * | 5/1969 | Donofrio | 440/12.6 |
| 3,450,089 A | * | 6/1969 | Lippincott | 440/12.7 |
| 3,941,074 A | * | 3/1976 | Millerbernd | 114/344 |
| 4,744,324 A | | 5/1988 | Martinmaas | |
| 4,852,521 A | * | 8/1989 | Harrington | 119/51.04 |
| 5,687,669 A | * | 11/1997 | Engler | 440/12.52 |
| 6,116,972 A | * | 9/2000 | Bellezza Quater et al. | 440/12.51 |

FOREIGN PATENT DOCUMENTS

| | | | |
|---|---|---|---|
| CH | 410 660 | 10/1966 | |
| DE | 35 22 041 | 1/1987 | |
| DE | 38 32 559 | 2/1990 | |
| DE | 39 16 200 | 11/1990 | |
| DE | 298 15 500 | 4/1999 | |
| EP | 0069621 A1 * | 1/1983 | 440/12.66 |
| FR | 514 690 | 3/1921 | |
| FR | 2 411 095 | 7/1979 | |
| FR | 2540794 A1 * | 8/1984 | 440/12.5 |
| GB | 995050 | 6/1965 | |
| GB | 2287910 A * | 10/1995 | 440/12.5 |
| JP | 02-124306 A * | 5/1990 | 440/12.5 |
| JP | 04-063708 A * | 2/1992 | 440/12.5 |
| JP | 04-063709 A * | 2/1992 | 440/12.51 |
| WO | WO 0218160 A1 * | 3/2000 | 440/12.5 |
| WO | WO 0218161 A1 * | 3/2002 | 440/12.5 |
| WO | WO 0218166 A1 * | 3/2002 | 440/12.51 |
| WO | WO 0222383 A1 * | 3/2002 | 440/12.5 |
| WO | WO 02060707 A2 * | 8/2002 | 440/12.51 |

* cited by examiner

Primary Examiner—S. Joseph Morano
Assistant Examiner—Ajay Vasudeva
(74) Attorney, Agent, or Firm—Kenyon & Kenyon

(57) ABSTRACT

An amphibious vehicle having an open seating arrangement includes one driving engine for reciprocally or simultaneously powering an all-wheel-drive travel drive and a swim drive, constructed as jet drive, with the aid of at least two clutches which are independent of one another, the driving engine being arranged essentially in the center between the axles of the travel drive below the seating arrangement.

9 Claims, 2 Drawing Sheets

AMPHIBIOUS VEHICLE

FIELD OF THE INVENTION

The present invention relates to an amphibious vehicle having a single driving engine which may power a travel drive and a swim drive simultaneously or independently of one another by choice.

BACKGROUND INFORMATION

Motor vehicles of the most varied type are being increasingly used in the leisure-time sector for pleasure purposes. Examples of this are snowmobiles, jet skis or even dune buggies which are constructed with three or four balloon tires and therefore are able to move in sand, as well. Disadvantageous in such vehicles is that, in each case, they are only usable in one environment, or else are not suitable for pleasure purposes. Examples for this are snow cats or amphibious vehicles. Amphibious vehicles for military or civil purposes are relatively large and unwieldy. The reason for this is mainly that the bottom side of the motor vehicle is modeled after a boat hull to ensure the ability to float. In other type models, the attempt is being made to improve the buoyancy of conventional motor vehicles by modifications such as float outriggers, the water speeds attainable thereby remaining unsatisfactory.

German Published Patent Application No. 35 22 041 describes an all-wheel-drive amphibious vehicle having high water-travel speed, in which, by arranging a paddle and baffle-plate system at all four wheels, strong buoyancy forces are produced during water travel which lift the vehicle body out of the water. Only the wheels with the paddles remain in contact with the water. Since the particularly high resistance in water, otherwise inherent in the shape of amphibious vehicles, thereby ceases to exist, the propulsion forces likewise produced by the paddle system can lend to the vehicle the high water-travel speed demanded. The paddles of the system with their mount fixtures are detachably arranged on the wheels, and must be detached for land travel and installed prior to swim operation. Alternatively, it is proposed to join the wheels and the paddle system permanently to one another. Disadvantageous in the amphibious vehicles, depending on the model type, is either the cumbersome assembly and disassembly, respectively, or the high costs for an automatic insertion and ejection device for the paddle system.

German Published Patent Application No. 38 32 559 describes an amphibious motor vehicle having an engine which powers a water drive directly, and powers a land drive via a gear. Inserted in the drive train of the land drive is a clutch, the coupling force of which during landing and leaving the water is variable in accordance with the difference between the actual speed and the setpoint speed of the land drive in such a way that the drive speed is regulable in a controlled manner up to the setpoint speed. In this manner, the driving engine of the amphibious motor vehicle can be run with full speed even during landing, so that the water drive, which can be constructed as a screw or jet, supplies the maximum thrust for supporting the landing and the exit from the water.

German Published Patent Application No. 39 16 200 describes a drive system for an amphibious vehicle in which only a single driving engine is necessary, and nevertheless, the travel drive and the swim drive can be operated simultaneously or independently of one another by choice. In this manner, it is possible that, given simultaneous operation of the travel drive and the swim drive using only one driving engine, and preferably at constant engine speed, the travel drive train and the swim drive train are controllable or regulable independently of one another with respect to speed and output. In particular, this is of great advantage during landing (transition from water to land) and leaving land (transition from land into the water), so that, for example, the wheels of the amphibious vehicle do not dig into the soft ground of the shore. A single travel drive train is sufficient for the travel drive, and a single swim drive train is sufficient for the swim drive. If the amphibious vehicle has a plurality of swim propulsion devices, e.g., several propellers or several hydrojets, it is then advantageous if each of these swim propulsion devices has its own swim drive train, which are controllable or regulable jointly or independently of one another by choice.

Therefore, it is an object of the present invention to provide an off-road amphibious vehicle particularly for free-time purposes, which is switchable from normal driving operation to swim operation with minimal expenditure, allows sufficiently great speeds in both operating modes, and permits an open seating position of the motor-vehicle driver.

SUMMARY

Due to the central arrangement of the driving engine, the center of gravity of the amphibious vehicle may be shifted in the direction of the buoyancy point, such that the center of gravity of the vehicle in the known state is located above the buoyancy point, so that essentially no moments of rotation occur. Despite the open seating arrangement, the amphibious vehicle thereby maintains a stable water position which for the first time permits a meaningful water operation. Due to the all-wheel drive, the amphibious vehicle has full off-road capability. On one hand, the swim drive, configured as a jet drive, may ensure sufficient water speeds, and secondly, in contrast to a screw, may not be so easily damaged in normal driving operation, as well as representing no injury risk for a third party.

In an example embodiment, the tires of the amphibious vehicle may be constructed as balloon tires which, on one hand, are of benefit to the normal driving operation in sand, and secondly, act simultaneously as buoyancy bodies during swim operation, the rear balloon tires, for example, being somewhat larger than the front balloon tires for the normal driving operation.

Furthermore, to improve the buoyancy, additional discrete buoyancy bodies, e.g., constructed as air tanks, may be provided in the front and/or rear region of the amphibious vehicle. Moreover, the buoyancy point may be better adjusted with the aid of these discrete buoyancy bodies, which may be detachable.

DETAILED DESCRIPTION

Figure 1:
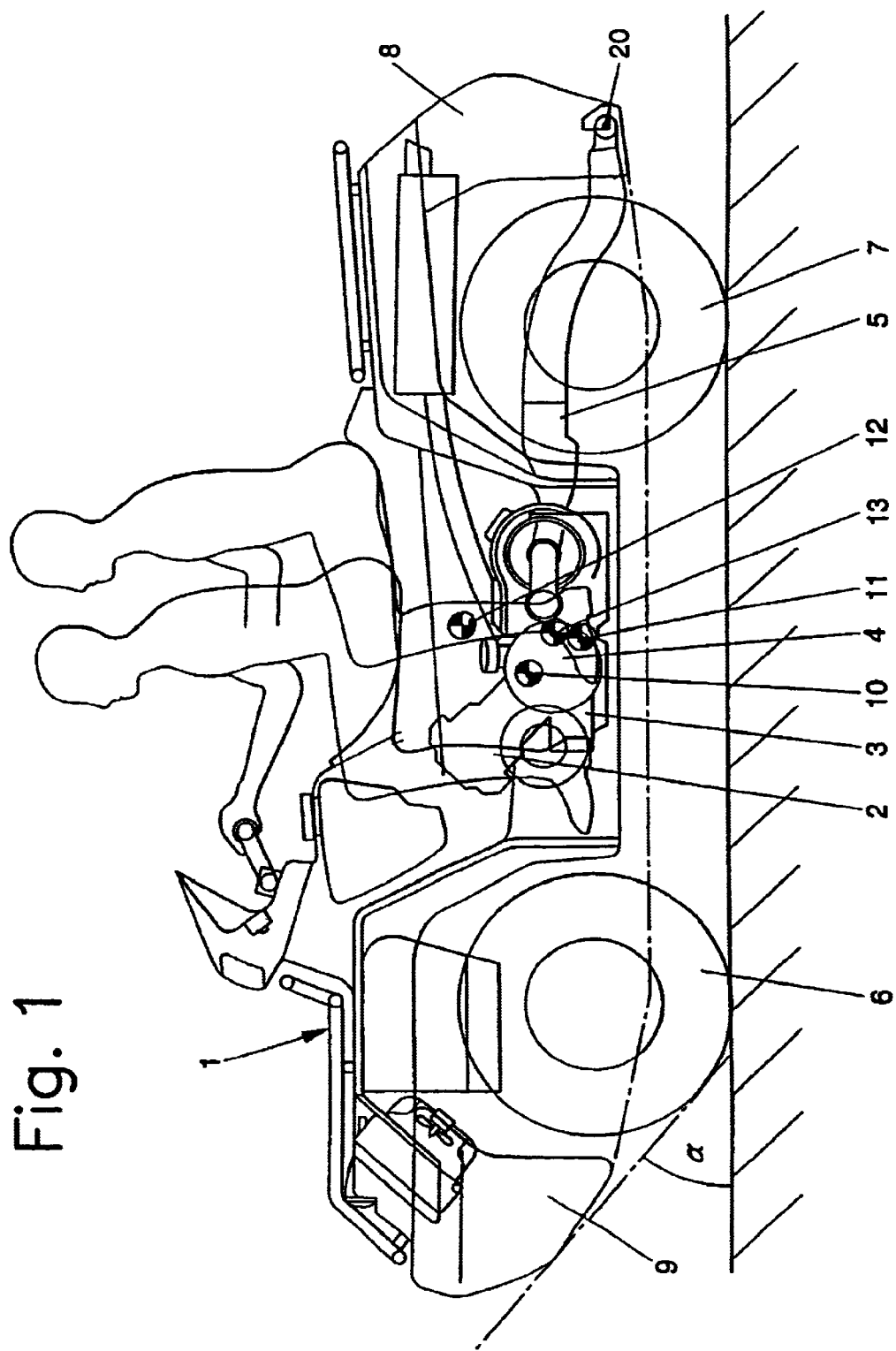
FIG. 1 is a schematic side view of an amphibious vehicle.

FIG. 1 illustrates an amphibious vehicle 1 having an open seating arrangement for two persons. Amphibious vehicle 1 includes a driving engine 2, an engine transmission 3, a first clutch 4 for actuating a jet drive 5 and two further clutches for the independent driving of front wheels 6 and rear wheels 7. In addition, amphibious vehicle 1 includes an air tank 8 arranged in the rear region of amphibious vehicle 1 and an air tank 9 arranged in the front region. Driving engine 2 is positioned in the center between the front axle and the rear axle below the driver. At vehicle curb weight, center of gravity 10 may thereby be shifted in front of the seating position of the driver. The buoyancy, which is essentially produced by front wheels 6 and rear wheels 7, constructed with balloon tires, as well as the two air tanks 8, 9 may be adjusted by their dimensioning so that buoyancy point 11 at vehicle curb weight is under the seating position of the driver. Due to the additional weight of the two vehicle occupants who sit relatively high, center of gravity 12 at loaded vehicle weight shifts upwardly, on the one hand, and secondly, shifts below the seating position of the driver. Since buoyancy point 13 at loaded vehicle weight only shifts upwardly, center of gravity 12 and buoyancy point 13 are on one line of action, so that no resulting moment of rotation exists and amphibious vehicle 1 assumes a stable float position. To improve the flow dynamics, air tank 9 is configured with a chamfer, the apex of which forms an angle $\alpha$ of, e.g., 40° with respect to the water surface.

A further possibility for improving the buoyancy is to increase the axle width of amphibious vehicle 1 compared to conventional off-road vehicles, as, for example, dune buggies.

Figure 2:
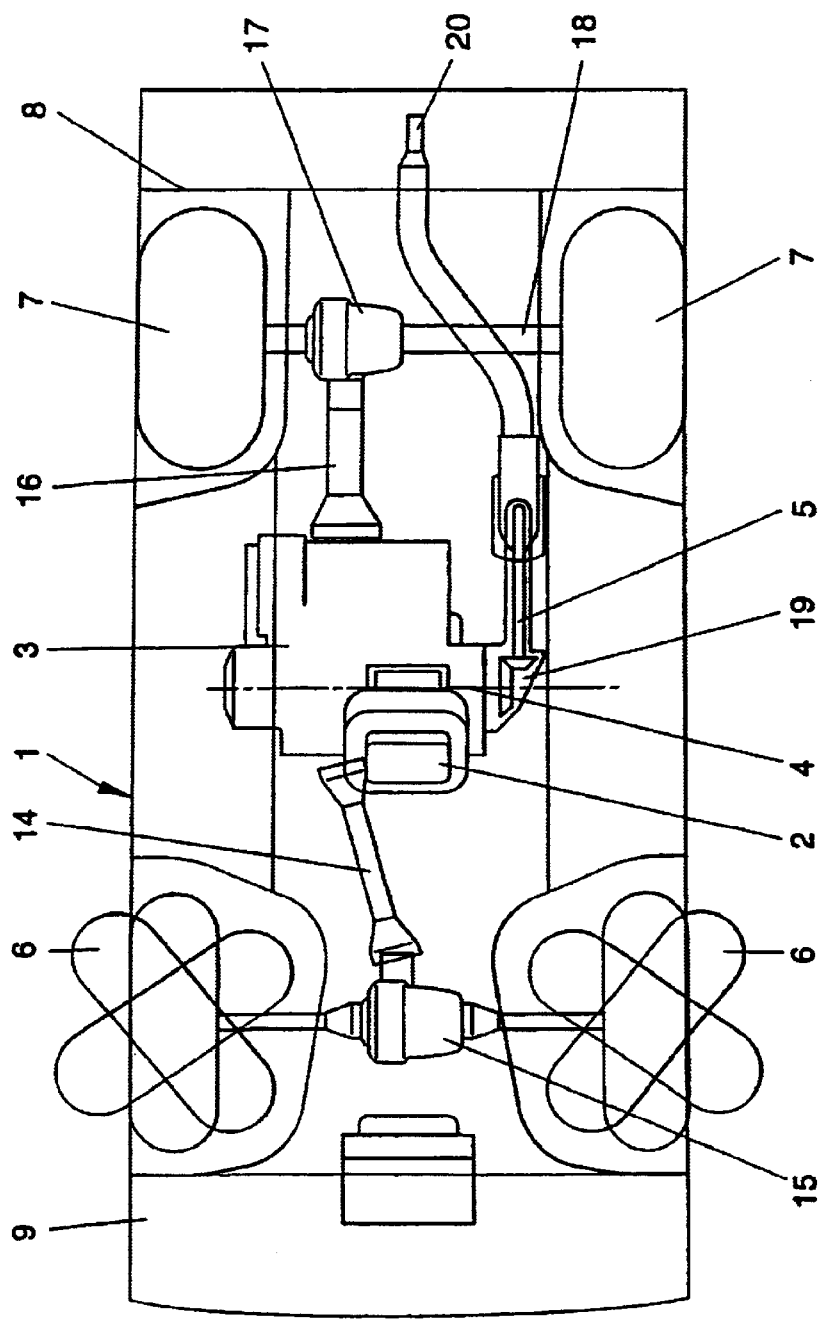
FIG. 2 is a schematic bottom view of the amphibious vehicle.

The configuration and operating mode of the drive trains are explained below with reference to the schematic bottom view illustrated in FIG. 2. The drive trains include centrally arranged driving engine 2 and engine transmission 3, which are allocated both to the travel drive and to jet drive 5. Engine transmission 3 is connected via a cardan shaft 14 to a front-axle differential 15, by way of which front wheels 6 are able to be propelled. Engine transmission 3 is also connected via a transmission output shaft 16 to a rear-axle differential 17, by way of which both rear wheels 7 are able to be propelled with the aid of a rigid rear axle 18. To separate the travel train, at least two clutches are provided which are arranged either at engine transmission 3, or else in front-axle differential 15 and rear-axle differential 16, respectively. The two clutches are controllable independently of one another. The engine transmission may be forced into engagement with a bevel gear 19 of jet drive 5 via clutch 4, clutch 4 being controllable independently.

During normal driving, clutch 4 is open, and front wheels 6 and/or rear wheels 7 are propelled by driving engine 2 and engine transmission 3. During swim operation, clutch 4 is closed and a screw is set in rotation by engagement of bevel gear 19, the screw drawing in water via an opening in the floor and pressing it in the direction of jet nozzle 20. The expelled water jet then produces a forward impulse on amphibious vehicle 1, thereby propelling it. The travel drive train may be decoupled in swim operation, or else may be used to support the buoyancy. To that end, the reverse gear is engaged so that front wheels 6 and rear wheels 7 rotate contrary to the direction of travel. For example, it is also possible to drive only rear wheels 7 via the mutually independent clutches. The steering during swim operation occurs primarily via swivelling jet nozzle 20, it being possible to optionally utilize the steering of front wheels 6 for support. Upon landing, the travel drive train, in forward, is then shifted down, the drive torque being controlled or regulated so that the wheels do not dig into the ground underneath. Here, for example, an arrangement described in German Published Patent Application No. 39 16 200 may be used.

What is claimed is:

1. An amphibious vehicle having an open seating arrangement, comprising:
    an all-wheel-drive travel drive;
    a swim drive including a jet drive;
    at least two independent clutches; and
    one driving engine configured to one of reciprocally and simultaneously power the travel drive and the swim drive via the clutches, the engine disposed substantially in a center between axles of the travel drive below the seating arrangement.

2. The amphibious vehicle according to claim 1, wherein the travel drive includes front wheel and rear wheels, tires of the front wheel and the rear wheels including balloon tires.

3. The amphibious vehicle according to claim 1, further comprising buoyancy bodies arranged at least one of in a front region and a rear region.

4. The amphibious vehicle according to claim 3, wherein the buoyancy bodies include air tanks.

5. The amphibious vehicle according to claim 1, wherein the seating arrangement includes a two-seater arrangement.

6. An amphibious vehicle having an open seating arrangement, comprising:
    an all-wheel-drive travel drive;
    a swim drive including a jet drive;
    at least two independent clutches; and
    one driving engine configured to one of reciprocally and simultaneously power the travel drive and the swim drive via the clutches, the engine disposed substantially in a center between axles of the travel drive below the seating arrangement,
    wherein the travel drive includes front wheel and rear wheels, tires of the frond wheel and the rear wheels including balloon tires, and
    wherein the balloon tires of the rear wheels have a larger volume than the balloon tires of the front wheels.

7. An amphibious vehicle having an open seating arrangement, comprising:
    an all-wheel-drive travel drive;
    a swim drive including a jet drive;
    at least two independent clutches; and
    one driving engine configured to one of reciprocally and simultaneously power the travel drive and the swim drive via the clutches, the engine disposed substantially in a center between axles of the travel drive below the seating arrangement,
    further comprising buoyancy bodies arranged at least one of in a front region and a rear region,
    wherein the buoyancy bodies arranged in the front region provide a greater buoyancy than the buoyancy bodies arranged in the rear region.

8. A method for operating an amphibious vehicle having an open seating arrangement, the amphibious vehicle including an all-wheel-drive travel drive, a swim drive including a jet drive, at least two independent clutches, and one driving engine configured to one of reciprocally and simultaneously power the travel drive and the swim drive via the clutches, the engine disposed substantially in a center between axles of the travel drive below the seating arrangement, the comprising the steps of:
    engaging the travel drive during a swim operation; and
    driving at least one of front wheels and rear wheels of the travel drive contrary to a direction of travel.

9. A method for operating an amphibious vehicle having an open seating arrangement, the amphibious vehicle including an all-wheel-drive travel drive, a swim drive including a jet drive, at least two independent clutches, and one driving engine configured to one of reciprocally and simultaneously power the travel drive and the swim drive via the clutches, the engine disposed substantially in a center between axles of the travel drive below the seating arrangement, the comprising the steps of:
    controlling the amphibious vehicle by swivelling a jet nozzle of the jet drive during a swim operation; and
    supporting the controlling step by steering front wheels of travel drive.

* * * * *

UNITED STATES PATENT AND TRADEMARK OFFICE
CERTIFICATE OF CORRECTION

PATENT NO. : 6,672,916 B1
DATED : January 6, 2004
INVENTOR(S) : Lent-Phillips et al.

It is certified that error appears in the above-identified patent and that said Letters Patent is hereby corrected as shown below:

Column 2,
Line 12, "are controllable" should be changed to -- is controllable --;

Column 4,
Lines 48-49, "arrangement, the comprising" should be changed to -- arrangement, the method comprising --; and
Lines 60-61, "arrangement, the comprising" should be changed to -- arrangement, the method comprising --.

Signed and Sealed this

Twenty-third Day of November, 2004

JON W. DUDAS
*Director of the United States Patent and Trademark Office*